US012782093B2

(12) United States Patent
Yonezawa

(10) Patent No.: US 12,782,093 B2
(45) Date of Patent: Nov. 3, 2026

(54) GAS GENERATOR

(71) Applicant: DAICEL CORPORATION, Osaka (JP)

(72) Inventor: Kenichi Yonezawa, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 18/949,824

(22) Filed: Nov. 15, 2024

(65) Prior Publication Data

US 2025/0076008 A1 Mar. 6, 2025

Related U.S. Application Data

(63) Continuation of application No. PCT/JP2023/017013, filed on May 1, 2023.

(30) Foreign Application Priority Data

May 16, 2022 (JP) ................................ 2022-080031

(51) Int. Cl.
*F42B 3/04* (2006.01)
*B60R 21/263* (2011.01)
*B60R 21/264* (2006.01)

(52) U.S. Cl.
CPC .............. *F42B 3/04* (2013.01); *B60R 21/263* (2013.01); *B60R 21/2644* (2013.01); *B60R 2021/2642* (2013.01); *B60R 2021/2648* (2013.01)

(58) Field of Classification Search
CPC .................................... F42B 3/04; F42B 3/06
(Continued)

(56) References Cited

U.S. PATENT DOCUMENTS 6,364,354 B1 * 4/2002 Nakashima ........ B01D 46/2411 280/736
2002/0167155 A1 11/2002 Nakashima et al.
(Continued)

FOREIGN PATENT DOCUMENTS

JP 2000-335361 A 12/2000
JP 2012171362 A * 9/2012 ............ F16K 17/16

OTHER PUBLICATIONS

International Search Report and Written Opinion of the International Searching Authority for International Application No. PCT/JP2023/017013, dated Jul. 25, 2023, with English translation.

*Primary Examiner* — Bret Hayes
(74) *Attorney, Agent, or Firm* — Birch, Stewart, Kolasch & Birch, LLP

(57) ABSTRACT

A gas generator includes a housing, one or more first discharge ports and one or more second discharge ports both provided in the housing configured to discharge the combustion gas. A closing member covers at least one of the one or more first discharge ports and at least one of the one or more second discharge ports together. The closing member includes a portion covering the at least one first discharge port and configured to rupture at a first rupture pressure and a portion covering the at least one second discharge port and configured to rupture at a second rupture pressure. The closing member includes a breakage assisting portion configured to reduce a strength of the closing member at at least a boundary portion between the at least one first discharge port and the at least one second discharge port.

19 Claims, 9 Drawing Sheets

CIRCUMFERENTIAL DIRECTION

(58) Field of Classification Search
USPC .................................................. 102/530, 531
See application file for complete search history.

(56) References Cited

U.S. PATENT DOCUMENTS

| | | | | |
|---|---|---|---|---|
| 2005/0151356 | A1* | 7/2005 | Ohji | B60R 21/2644 280/741 |
| 2024/0132011 | A1* | 4/2024 | Hakozaki | B60R 21/2644 |
| 2024/0190377 | A1* | 6/2024 | Fukumoto | B60R 21/239 |

* cited by examiner

GAS GENERATOR

CROSS REFERENCE TO RELATED APPLICATIONS

This application is a Continuation of PCT International Application No. PCT/JP2023/017013, filed on May 1, 2023, which claims priority under 35 U.S.C. 119(a) to Patent Application No. 2022-080031, filed in Japan on May 16, 2022, all of which are hereby expressly incorporated by reference into the present application.

TECHNICAL FIELD

The present invention relates to a gas generator.

BACKGROUND ART

A known widely used gas generator fills a combustion chamber formed in a housing with a gas generating agent, burns the gas generating agent by using an igniter to generate combustion gas, and discharges the combustion gas to the exterior from a gas discharge port provided in the housing.

In the gas generator of Patent Document 1, two types of gas discharge ports having different diameters are provided in a peripheral wall portion of an upper container, and seal tape simultaneously closes these two types of gas discharge ports. A burst pressure of the seal tape closing these two types of gas discharge ports is regulated by the opening diameters of the gas discharge ports. It is proposed that this equalizes pressure inside the housing (hereinafter referred to as "combustion internal pressure") when a gas generation unit burns, thereby stabilizing a combustion performance.

CITATION LIST

Patent Literature

Patent Document 1: JP 2000-335361 A

SUMMARY OF INVENTION

Technical Problem

When a large-diameter discharge port (gas discharge port) and a small-diameter discharge port are covered together with the same seal tape and the pressure of the combustion gas is applied in a shearing direction, a portion covering the large-diameter discharge port ruptures earlier than a portion covering the small-diameter discharge port. That is, conceivably, the configuration is such that only the portion covering the large-diameter discharge port ruptures at a first rupture pressure, and the portion covering both discharge ports ruptures at a second rupture pressure higher than the first rupture pressure, stabilizing the combustion performance.

However, when the large-diameter discharge port (gas discharge port) and the small-diameter discharge port are covered together with one seal tape and pressure is applied to the portion covering the large-diameter discharge port, rupturing the seal tape, this force is transmitted to the periphery and may displace the position of the seal tape or partially lift the seal tape, thereby releasing the closed state of the small-diameter hole at a pressure lower than the original rupture pressure. In this case, part of the gas is discharged through the small-diameter discharge port. That is, when only the large-diameter discharge port should open, an extra opening is generated, resulting in a possibility that output characteristics such as an amount and a pressure of the combustion gas output from the gas generator will not be as designed.

The technique of the present disclosure has been made in view of the circumstances described above, and an object thereof is to provide a gas generator capable of achieving appropriate output.

Solution to Problem

To solve the above problem, the technique of the present disclosure adopts the following configuration. That is, a technique of a gas generator according to the present disclosure includes a housing, an igniter disposed in the housing, a gas generating agent that generates a combustion gas by actuation of the igniter, the gas generating agent being accommodated in the housing, one or more first discharge ports provided in the housing and configured to discharge the combustion gas generated in the housing to an outside, one or more second discharge ports provided in the housing together with the one or more first discharge ports and configured to discharge the combustion gas generated in the housing to the outside, and a closing member covering at least one of the one or more first discharge ports and at least one of the one or more second discharge ports together. The closing member includes a portion covering the at least one first discharge port and configured to rupture at a first rupture pressure and a portion covering the at least one second discharge port and configured to rupture at a second rupture pressure higher than the first rupture pressure, and the closing member includes a breakage assisting portion configured to reduce a strength of the closing member at at least a boundary portion of the closing member between the at least one first discharge port and the at least one second discharge port.

An opening area of the one or more first discharge ports may be set to be larger than an opening area of the one or more second discharge ports.

The breakage assisting portion may be a fragile portion provided in the closing member.

The closing member may be a sheet attached along a wall surface of the housing provided with the one or more first discharge ports and the one or more second discharge ports, and the breakage assisting portion may be an area of the closing member where a thickness dimension of the sheet is less than a thickness dimension of at least the portion covering the at least one second discharge port.

The closing member may be a sheet attached along a wall surface of the housing provided with the one or more first discharge ports and the one or more second discharge ports, and the breakage assisting portion may be a linear area where a cut portion cut in a thickness direction of the sheet and a non-cut portion not cut are alternately arrayed in the closing member.

The closing member may be a sheet attached to a wall surface of the housing in a circumferential direction of the housing and may include, at a boundary portion between the portion covering the at least one first discharge port and the portion covering the at least one second discharge port in the circumferential direction, a cutout portion where the closing member is cut out, narrowing a width of the closing member in a width direction of the closing member, and the breakage assisting portion may be an area of the closing member where the width is narrowed by the cutout portion.

The closing member may be a sheet attached along a wall surface of the housing provided with the one or more first discharge ports and the one or more second discharge ports, and the breakage assisting portion may be a protrusion formed at a boundary portion between the at least one first discharge port and the at least one second discharge port and protruding from the wall surface of the housing toward the closing member.

The one or more first discharge ports and the one or more second discharge ports may be arrayed on a wall surface of the housing in a circumferential direction of the housing, the closing member may be provided in an arrayed direction of the one or more first discharge ports and the one or more second discharge ports, and the breakage assisting portion may be provided in a direction in which the portion covering the at least one first discharge port and the portion covering the at least one second discharge port are separated from each other in the closing member.

The breakage assisting portion may be linearly formed and may surround the at least one first discharge port or the at least one second discharge port.

Advantageous Effects of Invention

According to the present disclosure, it is possible to provide a gas generator capable of achieving appropriate output.

DESCRIPTION OF EMBODIMENTS

A gas generator according to embodiments of the present disclosure will be described below with reference to the drawings. Note that the respective configurations and the combinations thereof in the respective embodiments are merely examples, and additions, omissions, substitutions, and other changes to the configurations can be made as appropriate without departing from the gist of the present invention. The present disclosure is not limited by the embodiments and is limited only by the claims.

First Embodiment

Overall Configuration

Figure 1:
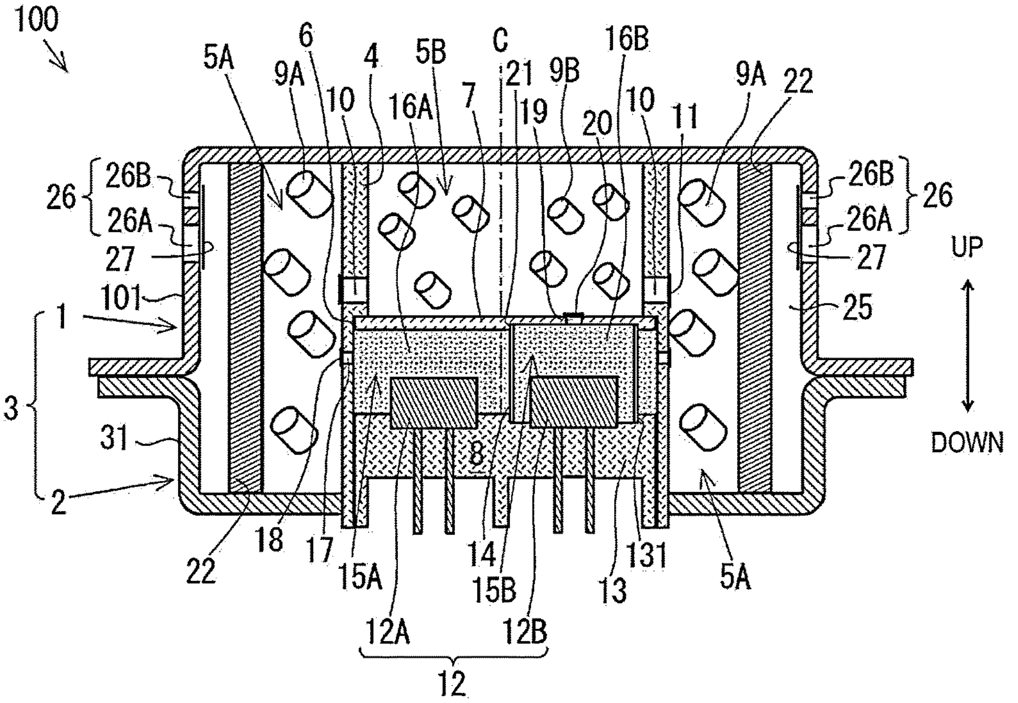
FIG. 1 is an axial cross-sectional view schematically illustrating an internal structure of a gas generator according to a first embodiment, along a center axis thereof.

FIG. 1 is an axial cross-sectional view schematically illustrating an internal structure of a gas generator 100 according to a first embodiment, along a center axis C thereof. Hereinafter, as illustrated in FIG. 1, a cross section obtained by cutting the gas generator 100 along the center axis C may be referred to as a "longitudinal cross section" of the gas generator 100. A direction along the center axis C of the gas generator 100 may be referred to as an "up-down direction" of the gas generator 100. FIG. 1 illustrates a state of the gas generator 100 before actuation. The gas generator 100 is, for example, an airbag gas generator that supplies an airbag with gas for expanding and inflating the airbag.

In the gas generator 100, an inner tubular member 4 having a substantially cylindrical shape is arranged in a housing 3 formed by bonding an upper container 1 including a gas discharge port 26 and a lower container 2 forming an internal accommodating space together with the upper container 1, and an outer side of the inner tubular member 4 is used as a first combustion chamber 5A. Further, the inner tubular member 4 is provided with a notched portion 6 on an inner side of a peripheral wall thereof, expanding an inner diameter of a lower portion thereof, and a partition wall 7 having a substantially flat circular shape is disposed at the notched portion 6 along a plane orthogonal to the center axis C. The interior of the inner tube is divided into two chambers by this partition wall 7, and a second combustion chamber 5B is formed on the upper container side and an igniter accommodating chamber 8 is formed on the lower container side. Therefore, in the gas generator 100, the first combustion chamber 5A and the second combustion chamber 5B are concentrically provided in the housing 3 and are adjacent to each other in a radial direction of the housing 3.

Gas generating agents 9 (9A, 9B) that generate a combustion gas when ignited by igniters 12 are accommodated in the first and second combustion chambers, and the igniters 12 actuated by an impact are accommodated in the igniter accommodating chamber 8. Through holes 10 are provided in the inner tubular member 4 partitioning the first combustion chamber 5A and the second combustion chamber 5B, and the through holes 10 are closed by a seal tape 11. However, the seal tape 11 ruptures when the gas generating agent 9B burns to generate the combustion gas, increasing a pressure in the second combustion chamber 5B. Therefore, when the gas generating agent 9B burns, both the combustion chambers 5A, 5B are made to be in communication with each other by the through holes 10. A material and a thickness of this seal tape 11 are adjusted, making the seal tape 11 break only when the gas generating agent 9B in the second combustion chamber 5B burns. In the present embodiment, a stainless steel seal tape having a thickness of 40 μm is used. Note that an opening area of the through hole 10 is set larger than that of a second discharge port 26B provided in the upper container 1.

The igniters 12 are configured to include a first igniter 12A and a second igniter 12B actuated by an actuation signal output on the basis of detection of impact by an external sensor. The first igniter 12A and the second igniter 12B are arranged with head portions thereof protruding with respect to a collar 13, the head portions being parallel to each other. In the gas generator 100 of the present embodiment, for example, after the collar 13 provided with the two igniters 12 (12A, 12B) is inserted into the inner tubular member 4, a lower end of the inner tubular member 4 is crimped to fix the collar 13, making it possible to easily fix the igniters 12 in a predetermined state. Further, this makes it possible to easily regulate a positional relationship such as orientations of and an interval between the two igniters 12. Note that the configuration is not limited to one in which the two igniters 12 are attached to one collar 13, and the first igniter 12A and the second igniter 12B may be attached to separate collars 13.

In the present embodiment, in a space between the collar 13 and the partition wall 7, a separation tube 14 having a substantially cylindrical shape is disposed surrounding either one of the igniters 12 (hereinafter referred to as the second igniter 12B), a first transfer charge accommodating chamber 15A is defined on an outer side thereof, a second transfer charge accommodating chamber 15B is defined on an inner side thereof, and the igniters 12 and transfer charges 16A, 16B constituting ignition units together with the igniters 12 are accommodated in the accommodating chambers.

When the transfer charge 16A accommodated in the first transfer charge accommodating chamber 15A burns, seal tape 18 closing a flame transferring hole 17 formed in the inner tubular member 4 ruptures, causing the first transfer charge accommodating chamber 15A to be in communication with the first combustion chamber 5A. Further, when the transfer charge 16B accommodated in the second transfer charge accommodating chamber 15B burns, seal tape 20 closing a flame transferring hole 19 formed in the partition wall 7 ruptures, causing the second transfer charge accommodating chamber 15B to be in communication with the second combustion chamber 5B. Thus, at the time of actuation of this gas generator 100, when the first igniter 12A is ignited (actuated), the flame ignites and burns the transfer charge 16A in the first transfer charge accommodating chamber 15A, and the flame passes through the flame transferring hole 17 formed in the inner tubular member 4 and ignites and burns the gas generating agent 9A accommodated in the first combustion chamber 5A located in the radial direction of the first transfer charge accommodating chamber 15A.

Further, the second igniter 12B ignites and burns the transfer charge 16B in the second transfer charge accommodating chamber 15B, and the flame passes through the flame transferring hole 19 provided in the axial direction of the second transfer charge accommodating chamber 15B, and ignites and burns the gas generating agent 9B accommodated in the second combustion chamber 5B, which is an extension of the flame transferring hole 19. Note that, in the present embodiment, the shapes of the gas generating agents 9A, 9B are not limited, and agents of known shapes can be used. This combustion gas generated in the second combustion chamber 5B flows into the first combustion chamber 5A through the through hole 10 provided on the upper container 1 side of the inner tubular member 4.

In particular, in the gas generator 100 illustrated in FIG. 1, the separation tube 14 disposed between the collar 13 and the partition wall 7 is disposed by providing a hole portion 21 corresponding to an outer shape of the separation tube 14 in a lower surface of the partition wall 7, providing a similar hole portion 131 in an upper surface of the collar 13, and fitting an upper end and a lower end of the separation tube 14 into the respective hole portions 21, 131.

With the separation tube 14 thus arranged, the flame of the transfer charge generated in any one of the transfer charge accommodating chambers does not directly burn the transfer charge in the other transfer charge accommodating chamber, and the gas generating agents 9A, 9B accommodated in the two combustion chambers are ignited and burned by the flame generated by the burning of the respective transfer charges in the different sections. That is, in a case in which the separation tube 14 is simply held between the partition wall 7 and the collar 13 without the hole portions 21, 131, when the transfer charge burns in the separation tube 14 (that is, in the second transfer charge accommodating chamber), the pressure of the gas generated by the combustion also acts to expand the separation tube in the radial direction. However, in the configuration of the present embodiment, the upper and lower end portions of the separation tube 14 are supported by the hole portions 21, 131, respectively, making it possible to suppress leakage of the combustion gas and the flame. However, the configuration is not limited thereto, and a configuration in which the separation tube 14 is held between the partition wall 7 and the collar 13 without the hole portions 21, 131 may be adopted.

Further, a coolant filter 22 for purifying and cooling the combustion gas generated by the combustion of the gas generating agents 9A, 9B is disposed in the housing 3, and an inner peripheral surface of the upper container 1 side is covered with a short pass prevention member. Thus, the combustion gas does not pass between an end surface of the coolant filter 22 and a ceiling inner surface of the upper container 1. A gap 25 is formed outside the coolant filter 22, allowing the combustion gas to pass over the entire surface of the filter 22.

A peripheral wall portion 101 of the upper container 1 is provided with gas discharge ports 26 that discharge the combustion gas generated in the housing 3 to outside of the gas generator 100. The gas discharge ports 26 include a first discharge port 26A and the second discharge port 26B having different diameters. The first discharge port 26A and the second discharge port 26B extend through the peripheral wall portion 101 from an inner side to an outer side thereof, and are formed with openings thereof having a circular shape. Further, a plurality of the first discharge ports 26A and a plurality of the second discharge ports 26B are provided in the circumferential direction of the upper container 1. The first discharge ports 26A have an opening area per port larger than that of the second discharge ports 26B. Further, the quantity of each port is the same. Therefore, the total opening area of the plurality of first discharge ports 26A is also larger than the total opening area of the plurality of second discharge ports 26B. For example, there may be 16 first discharge ports 26A each having a diameter of φ3.0 mm and there may be 16 second discharge ports 26B each having a diameter of φ2 mm. Note that the shape, the diameter, and the quantity of the discharge ports 26A, 26B are not particularly limited, and can be set as desired in accordance with required specifications of the gas generator 100. For example, the shape of the discharge ports 26A, 26B is not limited to a circular shape and may be an elliptical shape or a polygonal shape.

Further, a seal tape (closing member) 27 is attached to an inner surface of the peripheral wall portion 101 of the upper container 1, and the first discharge ports 26A and the second discharge ports 26B are covered together (across the first discharge ports 26A and the second discharge ports 26B) and closed by this seal tape 27.

Figure 2:
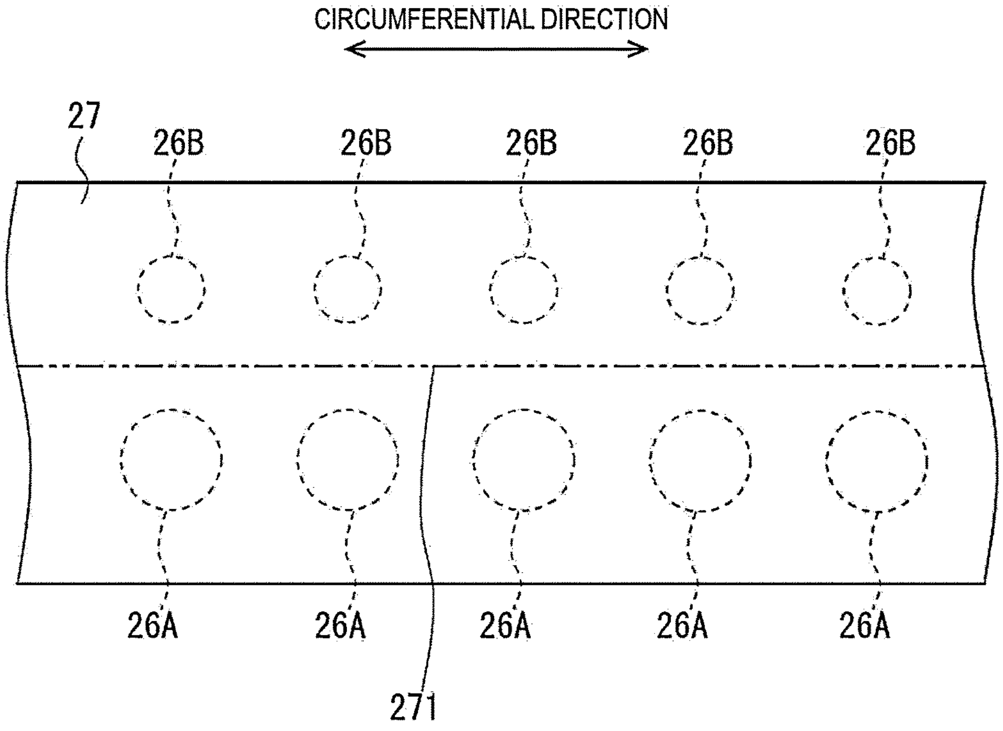
FIG. 2 is a view illustrating part of a seal tape covering first discharge ports and second discharge ports.
Figure 3:
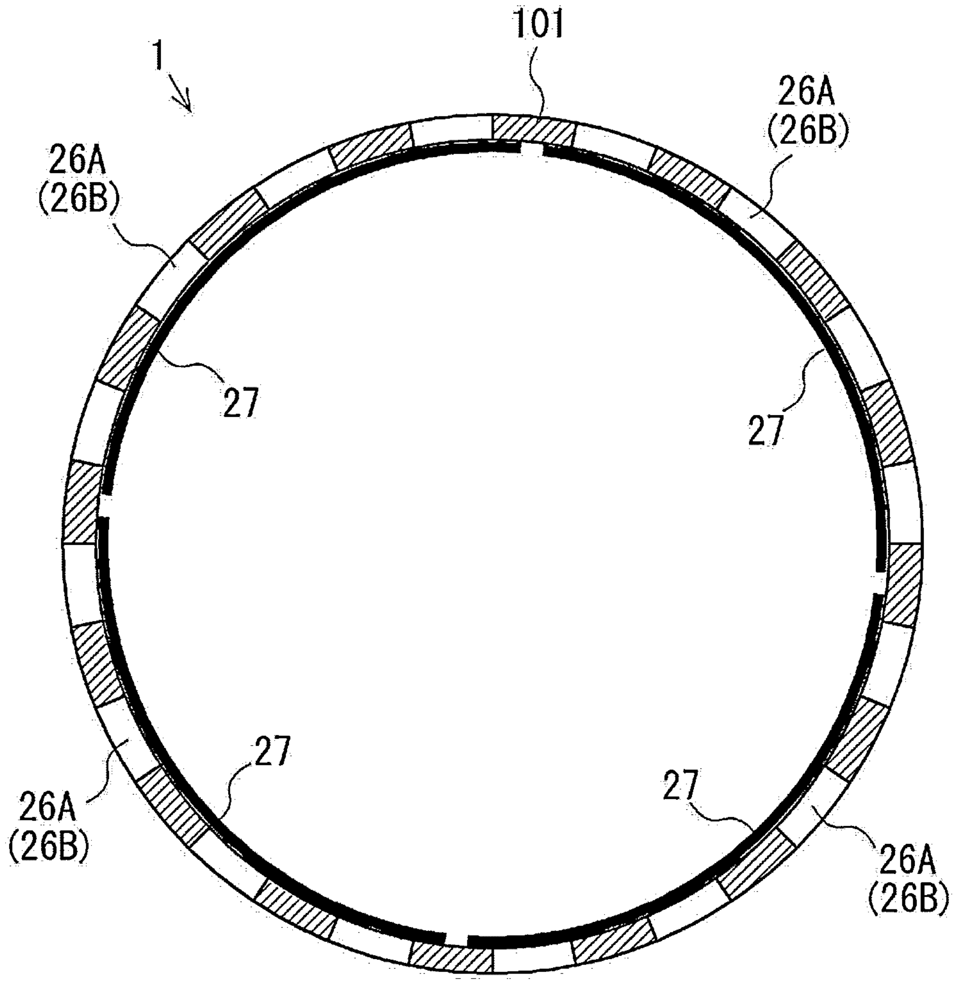
FIG. 3 is a view schematically illustrating a cross section orthogonal to a center axis of an upper container to which the seal tape is attached.

FIG. 2 is a view illustrating part of the seal tape 27 covering the first discharge ports 26A and the second discharge ports 26B, and FIG. 3 is a view illustrating a cross section orthogonal to the center axis C of the upper container 1 to which the seal tape 27 is attached. In the present embodiment, as illustrated in FIG. 2, the plurality of first discharge ports 26A are provided in a row in the circumferential direction of the upper container 1, and the plurality of second discharge ports 26A are provided above these first discharge ports 26B in a row in the circumferential direction of the upper container 1. That is, a row of the first discharge ports 26A and a row of the second discharge ports 26B are provided aligned in a center axis C direction.

The seal tape 27 is a sheet-like member elongated in a direction corresponding to the circumferential direction of the peripheral wall portion 101 when adhered to the peripheral wall portion 101. Desirably, the seal tape 27 has a width that further includes margins in the up-down direction even when simultaneously closing the two types of gas discharge ports 26 aligned in the center axis C direction. For example, desirably there is a margin of 2 to 3 mm from upper ends of the discharge ports 26A, 26B to an upper end of the seal tape 27 or from lower ends of the discharge ports 26A, 26B to a lower end of the seal tape. Further, the seal tape 27 preferably includes an aluminum seal layer having a thickness of 20 μm to 200 μm and an adhesive layer or a pressure-sensitive adhesive layer having a thickness of 5 to 100 μm. However, a material and a structure of the seal tape 27 are not particularly limited as long as a desired effect is exhibited.

In the present embodiment, a seal tape including an aluminum seal layer having a thickness of 50 μm and an adhesive layer or a pressure-sensitive adhesive layer having a thickness of 50 μm is used. Thus, in this example of the diameters, the rows of the discharge ports 26A, 26B are disposed adjacent to each other in the center axis C direction of the gas generator 100, but the arrangement is not limited thereto.

Note that the seal tape 27 is disposed covering at least one first discharge port 26A and at least one second discharge port 26B together. For example, applying the seal tape 27 in small pieces may increase the number of components and the manufacturing load. Therefore, many of the discharge ports 26A, 26B are desirably covered together. For example, one seal tape 27 may be configured to be adhered across the entire circumference of the inner wall surface of the upper container 1 and cover all the discharge ports 26A, 26B. However, the configuration is not limited thereto, and a configuration may be adopted in which the discharge ports 26A, 26B are covered with, for example, several pieces of seal tape 27 to such an extent that the manufacturing process is not complicated. In the example of FIG. 3, four pieces of the seal tape 27 cover the discharge ports 26A, 26B provided around the entire circumference of the inner wall surface of the upper container 1. Similarly, the discharge ports 26A, 26B may be covered with two or three pieces of the seal tape 27.

Each opening of the first discharge ports 26A having a diameter of 3 mm has an area of 7.1 $mm^2$, each opening of the second discharge ports 26B having a diameter of 2 mm has an area of 3.1 $mm^2$, and an opening diameter ratio and an opening area ratio of the first discharge port 26A to the second discharge port 26B are 1.5:1.0 and 2.3:1.0, respectively.

As described above, in the present embodiment, because the two types of the first discharge port 26A and the second discharge port 26B having different opening areas are closed by the same seal tape 27, the pressure (hereinafter, also referred to as rupture pressure) at which the portion of the seal tape 27 covering the first discharge ports 26A and second discharge ports 26B is broken to release the closure of the first discharge ports 26A and second discharge ports 26B is set in two stages. That is, a portion of the seal tape 27 covering the first discharge ports 26A is configured to rupture at a first rupture pressure, and a portion of the seal tape 27 covering the second discharge ports 26B is configured to rupture at a second rupture pressure higher than the first rupture pressure. Depending on how the gas generator 100 is actuated, the timing at which the portion of the seal tape 27 covering the second discharge ports 26B breaks may be later than the timing at which the portion covering the first discharge ports 26A breaks. Further, only the portion covering the first discharge ports 26A may break.

Further, the seal tape 27 includes a breakage assisting portion 271 in a longitudinal direction of the seal tape 27 at a center in a direction of alignment of the first discharge ports 26A and the second discharge ports 26B (width direction). That is, in a case in which the seal tape 27 is provided on the inner wall surface of the peripheral wall portion 101 and covers the first discharge ports 26A and the second discharge ports 26B, the breakage assisting portion 271 is disposed at a portion corresponding to a boundary between the first discharge ports 26A and the second discharge ports 26B. Here, the portion corresponding to the boundary (hereinafter, also referred to as a boundary portion) is, for example, a portion of the seal tape 27 positioned between the first discharge ports 26A and the second discharge ports 26B, and is a boundary portion between a region surrounding the first discharge ports defining the first discharge ports 26A and a region surrounding the second discharge ports defining the second discharge ports 26B. Note that, although the boundary portion is provided at a center between the first discharge ports 26A and the second discharge ports 26B in the example in FIG. 2, the position is not limited thereto, and the boundary portion may be provided closer to the first discharge ports 26A or may be provided closer to the second discharge ports 26B between the first discharge ports 26A and the second discharge ports 26B.

The breakage assisting portion 271 reduces the strength of at least the boundary portion of the seal tape 27 between the first discharge ports 26A and the second discharge ports 26B. The breakage assisting portion 271 of the present embodiment is an area (fragile portion) of the seal tape 27 in which the seal layer is formed thinner and more fragile than portions other than the breakage assisting portion 271, such as portions covering at least the first discharge ports 26A, the second discharge ports 26B, and peripheries thereof. For example, at the time of manufacture of the seal tape 27, the breakage assisting portion 271 is formed by making a cut having a predetermined depth in the seal layer. The breakage assisting portion 271 of the present embodiment is a so-called halfcut in which a cut is made, decreasing the thickness dimension of the fragile portion to half the thickness dimension of the seal layer not corresponding to the fragile portion. Therefore, as described below, in a case in which the portion of the seal tape 27 covering the first discharge ports 26A ruptures and the portion of the seal tape 27 covering the second discharge ports 26B does not rupture, the breakage assisting portion 271 breaks and only the portion covering the first discharge ports 26A is detached from the wall surface.

Operation

In the gas generator 100 formed as described above, when the first igniter 12A disposed in the igniter accommodating chamber 8 and outside the separation tube 14 is actuated, the transfer charge 16A accommodated in the first transfer charge accommodating chamber 15A ignites and burns, and the flame thereof passes through the flame transferring hole 17 of the inner tubular member 4 and burns the first gas generating agent 9A accommodated in the first combustion chamber 5A. Further, when the second igniter 12B surrounded by the separation tube 14 is actuated, the transfer charge 16B accommodated in the second transfer charge accommodating chamber 15B ignites and burns, and the flame thereof ignites and burns the second gas generating agent 9B accommodated in the second combustion chamber 5B.

Then, the flame in the second combustion chamber 5B passes through the through holes 10 and enters the first combustion chamber 5A. With the combustion path being different between the case in which the first igniter 12A is actuated and the case in which the second igniter 12B is actuated as described above, the timing at which each of the gas generating agents 9A, 9B burns is controlled and an output form (actuation performance) of the gas generator 100 is adjusted as desired by changing the ignition timings of the igniters 12A, 12B, for example, by actuating the second igniter 12A after actuating the first igniter 12B or by actuating the first and second igniters 12A, 12B simultaneously.

Here, when the pressure in the housing 3 exceeds the second rupture pressure by simultaneous actuation of the first and second igniters 12A, 12B or the like, the portion of the seal tape 27 covering the first discharge ports 26A and the second discharge port 26B ruptures, and the combustion gas is discharged from both the first discharge ports 26A and the second discharge ports 26B.

On the other hand, when the pressure in the housing 3 does not exceed the second rupture pressure but exceeds the first rupture pressure by actuation of only the first igniter 12A or the like, the portion of the seal tape 27 covering the first discharge ports 26A ruptures and the combustion gas is discharged from only the first discharge ports 26A. When the portion of the seal tape 27 covering the first discharge ports 26A ruptures and the portion covering the second discharge ports 26B does not rupture as described above and the breakage assisting portion 271 is not provided as in the related art, the portion covering the second discharge ports 26B adjacent thereto may be pulled and rupture in a case in which a force is exerted by the pressure of the combustion gas and peels the portion covering the first discharge ports 26A from the wall surface. In this case, the total opening area with respect to the combustion surface area of the gas generating agent 9A becomes larger than the design value, resulting in a possibility that desired power characteristics cannot be achieved.

On the other hand, in the present embodiment, even if a force is applied that causes the portion covering the first discharge ports 26A to peel from the wall surface by the pressure of the combustion gas, the breakage assisting portion 271 breaks and is separated from the portion covering the second discharge ports 26B, thereby suppressing rupture of the portion covering the second discharge ports 26B at the second rupture pressure or less. As a result, the gas generator 100 of the present embodiment can achieve appropriate output, maintaining a gas generation amount per unit time at the design value across a predetermined period after actuation of the gas generator 100 is initiated, for example.

First Modification

Figure 4:
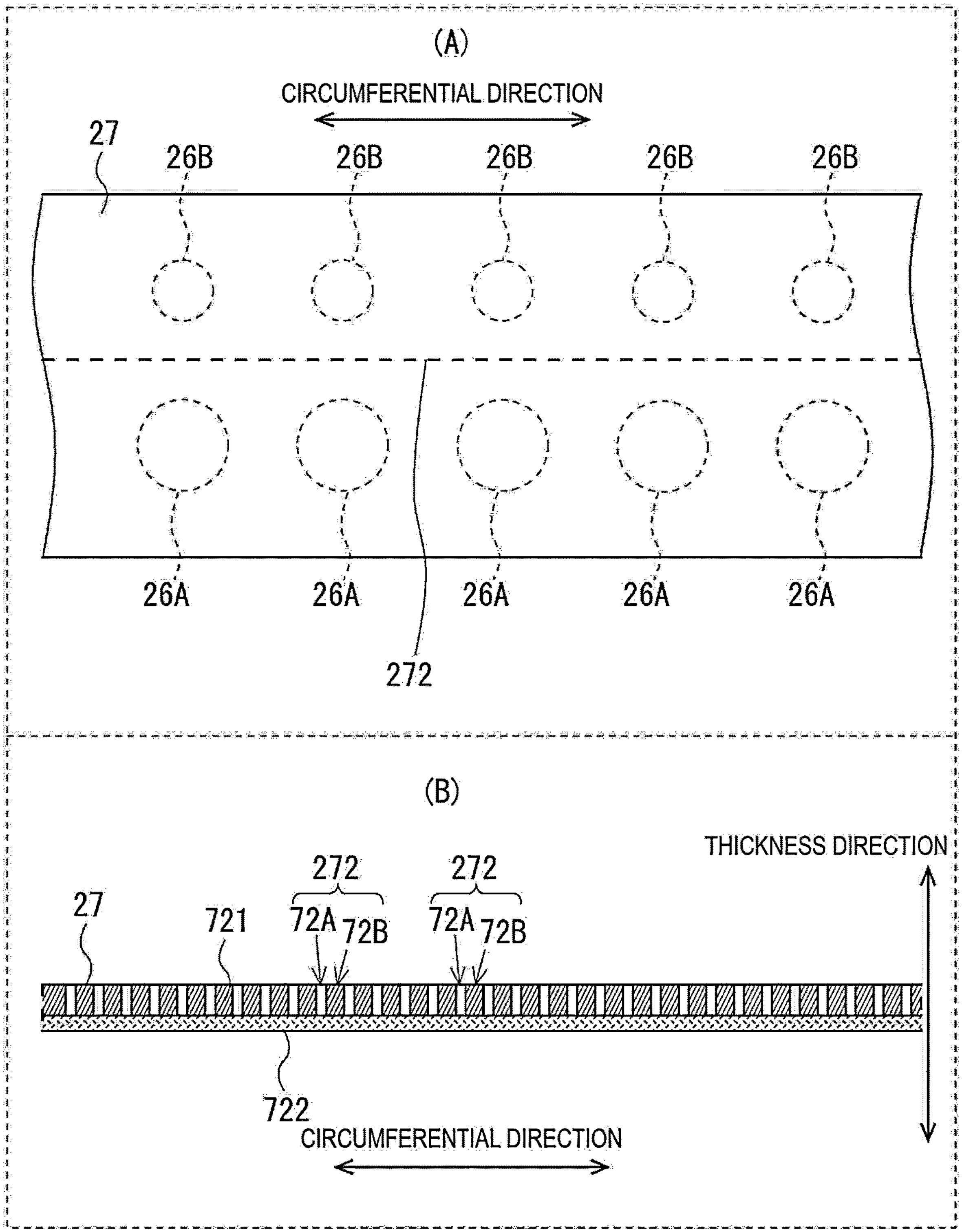
FIG. 4 is a view illustrating a configuration of the seal tape according to a first modification.

FIG. 4 is view illustrating a configuration of the seal tape 27 according to a first modification. In the first embodiment described above, the fragile portion of the seal tape 27 is a halfcut. However, in this modification, the fragile portion is made up of perforations. Note that, because other configurations are the same as those of the embodiment described above, the same elements are denoted by the same reference signs and the like, and description thereof will not be repeated.

(A) in FIG. 4 illustrates a state in which the seal tape 27 is viewed from a front surface side, and (B) schematically illustrates a cross section of the seal tape 27. In this modification, the seal tape 27 is provided with a breakage assisting portion 272 in the longitudinal direction at the center of the seal tape 27 in the width direction, as with the breakage assisting portion 271 of FIG. 2 in the embodiment described above. That is, in a case in which the seal tape 27 is provided on the inner wall surface of the peripheral wall portion 101 and covers the first discharge ports 26A and the second discharge ports 26B, the breakage assisting portion 272 is disposed at a portion corresponding to a boundary between the first discharge ports and the second discharge ports.

As illustrated in FIG. 4(B), the breakage assisting portion 272 of the present embodiment is a fragile portion in which cut portions 72A cut in the thickness direction and non-cut portions 72B are alternately formed from an adhesive layer 722 side (back surface side) of a seal layer 721 to an opposite side (front surface side) of the adhesive layer 722. The breakage assisting portion 272 is a so-called perforation, includes the cut portions 72A partially cut, and thus is a fragile portion formed more fragile than other portions. Therefore, when the pressure in the housing 3 exceeds the first rupture pressure without exceeding the second rupture pressure and a force that causes peeling from the wall surface is applied to the portion of the seal tape 27 covering the first discharge ports 26A, the breakage assisting portion 271 ruptures, separating the portion covering the first discharge ports 26A from the portion covering the second discharge ports 26B, thereby suppressing the rupture of the portion covering the second discharge ports 26B under the second rupture pressure or less. Accordingly, the gas generator 100 of this modification can achieve appropriate output.

Second Modification

Figure 5:
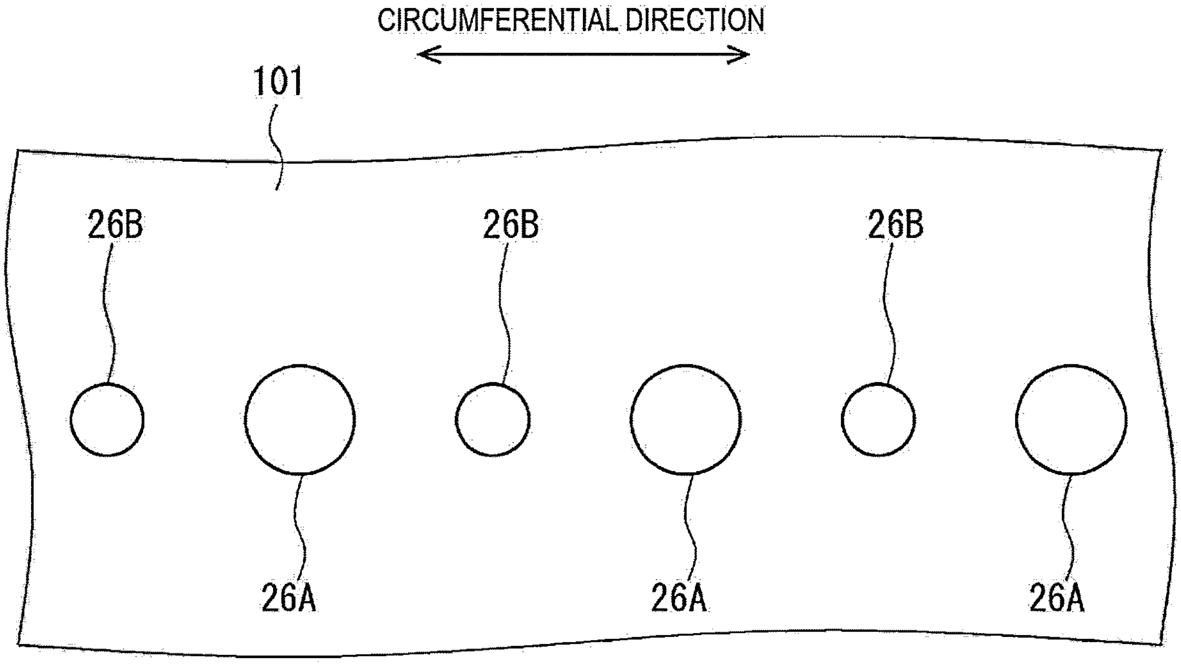
FIG. 5 is a view illustrating a configuration of the first discharge ports and the second discharge ports according to a second modification.
Figure 6:
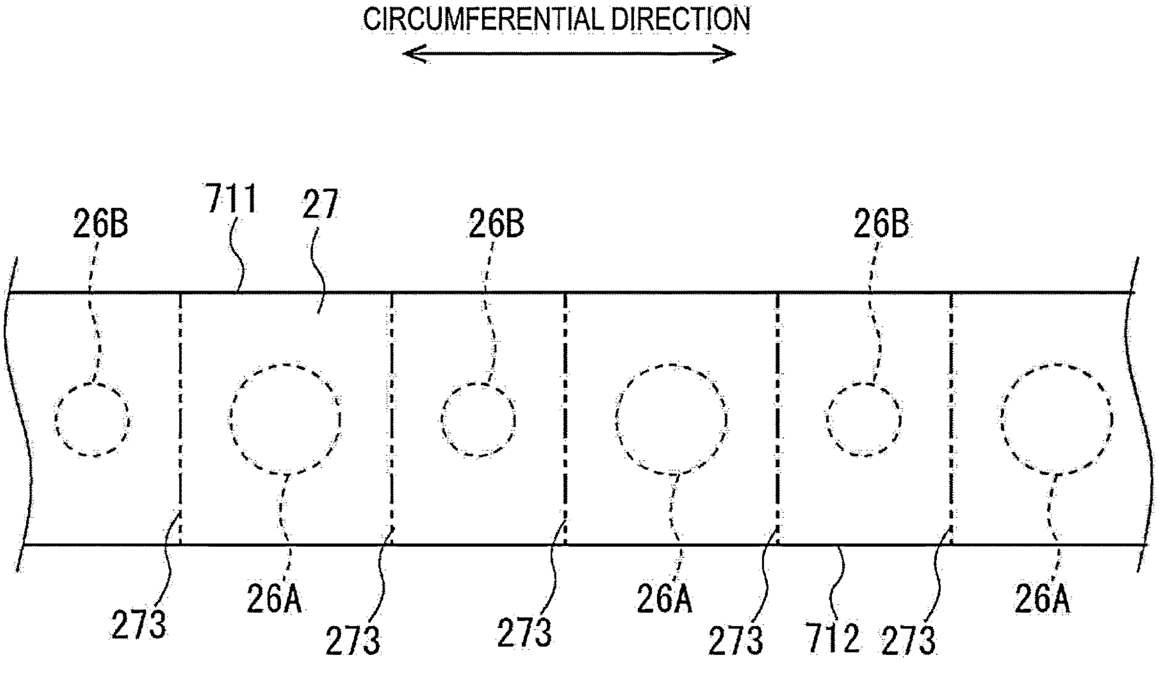
FIG. 6 is a view illustrating a configuration of the seal tape according to the second modification.

FIG. 5 is a view illustrating a configuration of the first discharge ports 26A and the second discharge ports 26B according to a second modification, and FIG. 6 is a view illustrating a configuration of the seal tape 27 according to the second modification. In the first embodiment described above, the first discharge ports 26A and the second discharge ports 26B are each arranged in rows in the circumferential direction of the upper container 1. On the other hand, in this modification, a configuration is adopted in which the first discharge ports 26A and the second discharge ports 26B are arrayed in a mixed manner in the circumferential direction of the upper container 1. Note that, because other configurations are the same as those of the embodiment described above, the same elements are denoted by the same reference signs and the like, and description thereof will not be repeated.

In this modification, as illustrated in FIG. 5, the first discharge ports 26A and the second discharge ports 26B are alternately disposed in the circumferential direction of the upper container 1, forming one row. As illustrated in FIG. 6, the seal tape 27 is disposed covering the first discharge ports 26A and the second discharge ports 26B together in an arrayed direction of the first discharge ports 26A and the second discharge ports 26B (circumferential direction of the upper container 1). In the seal tape 27 of this modification, at boundary portions between the first discharge ports 26A and the second discharge ports 26B aligned in the circumferential direction of the upper container 1, breakage assisting portions 273 are provided from an upper side 711 to a lower side 712 of the seal tape 27 in a direction of separating the seal tape 27 into the first discharge ports 26A and the second discharge ports 26B.

In the seal tape 27, each of the breakage assisting portions 273 of this modification is an area (fragile portion) in which the seal layer is formed thinner and more fragile than at least the portions covering the first discharge port 26A, the second discharge port 26B, and the peripheries thereof, and is, for example, a portion that is half cut. Note that the breakage assisting portion 273 is not limited to a half-cut portion, and may be a fragile portion made up of perforations as in the first modification.

Note that the first discharge ports 26A and the second discharge ports 26B need not be alternately arrayed. For example, a plurality of at least one of the first discharge ports 26A or the second discharge ports 26B may be continuously disposed in the arrayed direction (circumferential direction of the upper container 1). In this case, the same large holes (first discharge ports) and small holes (second discharge ports) adjacent to each other in the circumferential direction of the upper container 1 may be grouped together as single groups, and the breakage assisting portions 273 may be provided at boundaries of these groups, that is, at positions that separate boundary portions of the first discharge ports 26A and the second discharge ports 26B. In this case, the breakage assisting portions 273 need not be provided between the discharge ports 26A, 26B of the same group.

According to this modification, when the pressure in the housing 3 exceeds the first rupture pressure without exceeding the second rupture pressure and a force that causes peeling from the wall surface is applied to the portion of the seal tape 27 covering the first discharge ports 26A, the breakage assisting portions 273 rupture, causing separation from the portion covering the second discharge ports 26B, thereby suppressing the rupture of the portion covering the second discharge ports 26B under the second rupture pressure or less. Accordingly, the gas generator 100 of this modification can achieve appropriate output.

Third Modification

Figure 7:
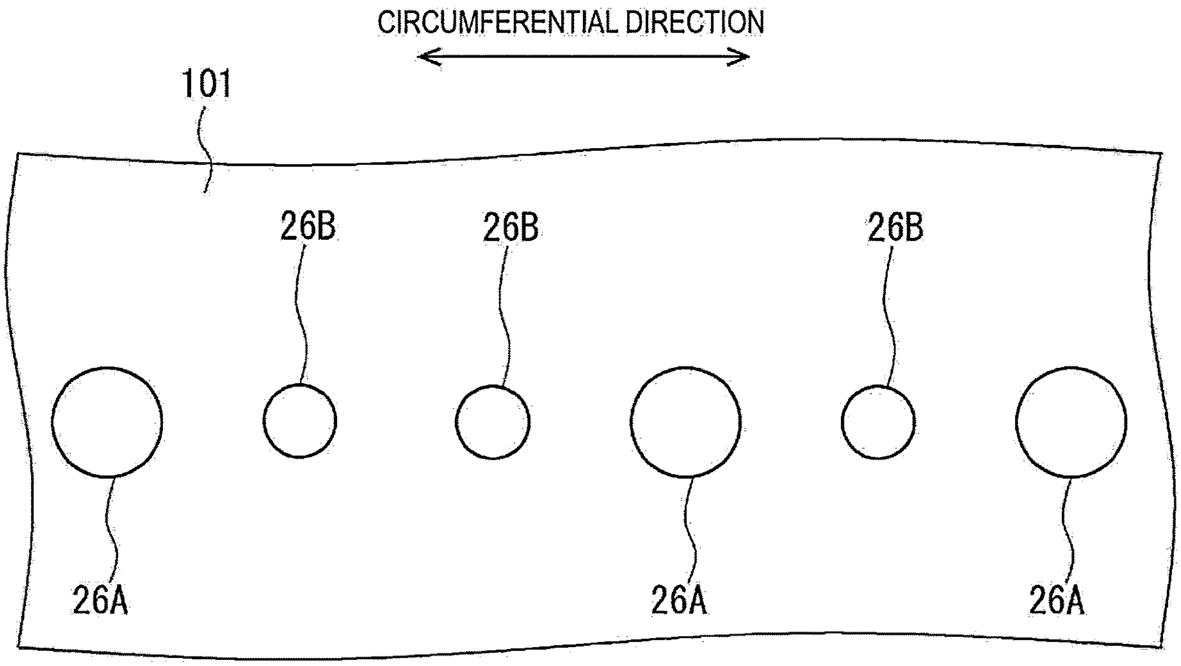
FIG. 7 is a view illustrating an arrangement of the first discharge ports and the second discharge ports according to a third modification.
Figure 8:
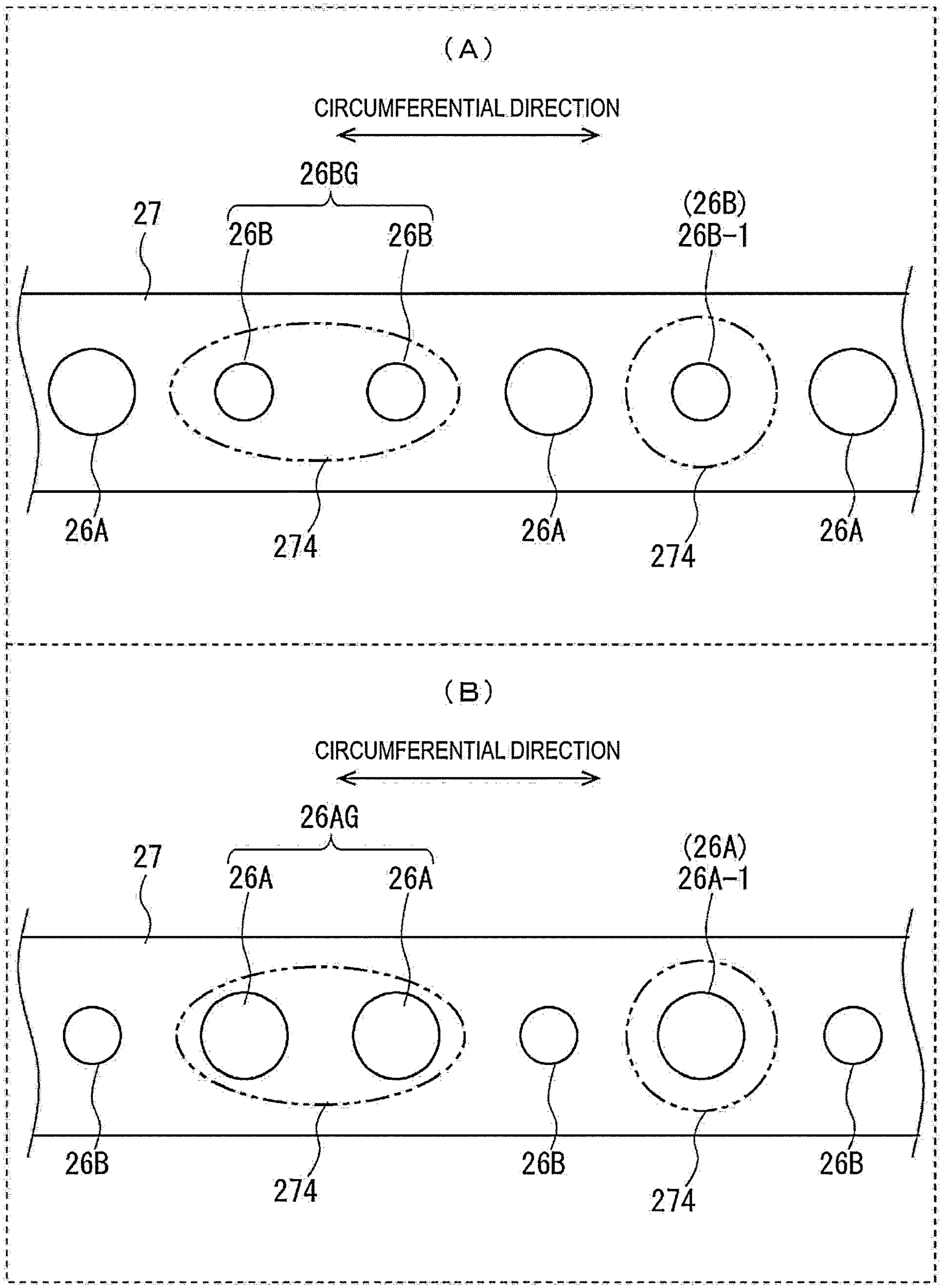
FIG. 8 is a view illustrating a configuration of the seal tape according to the third modification.

FIG. 7 is a view illustrating an arrangement of the first discharge ports 26A and the second discharge ports 26B according to a third modification, and FIG. 8 is a view illustrating a configuration of the seal tape 27 according to the third modification. This modification, as compared with the second modification described above, differs in the configuration of the seal tape 27. Note that, because other configurations are the same as those of the second modification described above, the same elements are denoted by the same reference signs and the like, and description thereof will not be repeated.

In this modification, as illustrated in FIG. 7, the first discharge ports 26A and the second discharge ports 26B are disposed in a mixed manner in the circumferential direction of the upper container 1, forming one row. The seal tape 27 is attached to the inner wall surface of the peripheral wall portion 101 in the circumferential direction of the upper container 1 and covers the first discharge ports 26A or the second discharge ports 26B.

A breakage assisting portion 274 of this modification is a fragile portion provided in the seal tape 27, and is provided linearly at positions surrounding the second discharge ports 26B when the seal tape 27 is adhered to the upper container 1. As in the first embodiment described above, the breakage assisting portion 274 may have a shape including a cut, making the thickness dimension of the seal layer smaller (thinner) than that of the portions covering the first discharge ports 26A and the second discharge ports 26B, or may be made up of perforations alternately including cut portions and non-cut portions as in the first modification.

As illustrated in FIG. 8(A), in a case in which a plurality of second discharge ports 26B are continuously disposed in the circumferential direction of the upper container 1 and form a group (second discharge port group) 26BG, the breakage assisting portion 274 may surround the plurality of second discharge ports 26B as the second discharge port group 26BG. Further, in a case in which the second discharge ports 26B are not continuous and only one second discharge port 26B-1 is present between two first discharge ports 26A, the breakage assisting portion 274 may surround the second discharge port 26B-1 as a single body. Note that the breakage assisting portion 274 is not limited to the configuration of surrounding the second discharge ports 26B as illustrated in FIG. 8(A), but may be configured to surround the first discharge port 26A as illustrated in FIG. 8(B). Here, in a case in which a plurality of the first discharge ports 26A are continuously disposed in the circumferential direction of the upper container 1 and form a first discharge port group 26AG, the breakage assisting portion 274 may be configured to surround the continuous plurality of first discharge ports 26A as the first discharge port group 26AG. Further, in a case in which the first discharge ports 26A are not continuous and only one first discharge port 26A-1 is present between two second discharge ports 26B, the breakage assisting portion 274 may be configured to surround the first discharge port 26A-1 as a single body.

According to this modification, when the pressure in the housing 3 exceeds the first rupture pressure without exceeding the second rupture pressure and a force that causes separation from the wall surface is applied to the portion of the seal tape 27 covering the first discharge ports 26A, the breakage assisting portions 274 rupture, causing separation from the portion covering the second discharge ports 26B, thereby suppressing the rupture of the portion covering the second discharge ports 26B under the second rupture pressure or less. Accordingly, the gas generator 100 of this modification can achieve appropriate output.

Fourth Modification

Figure 9:
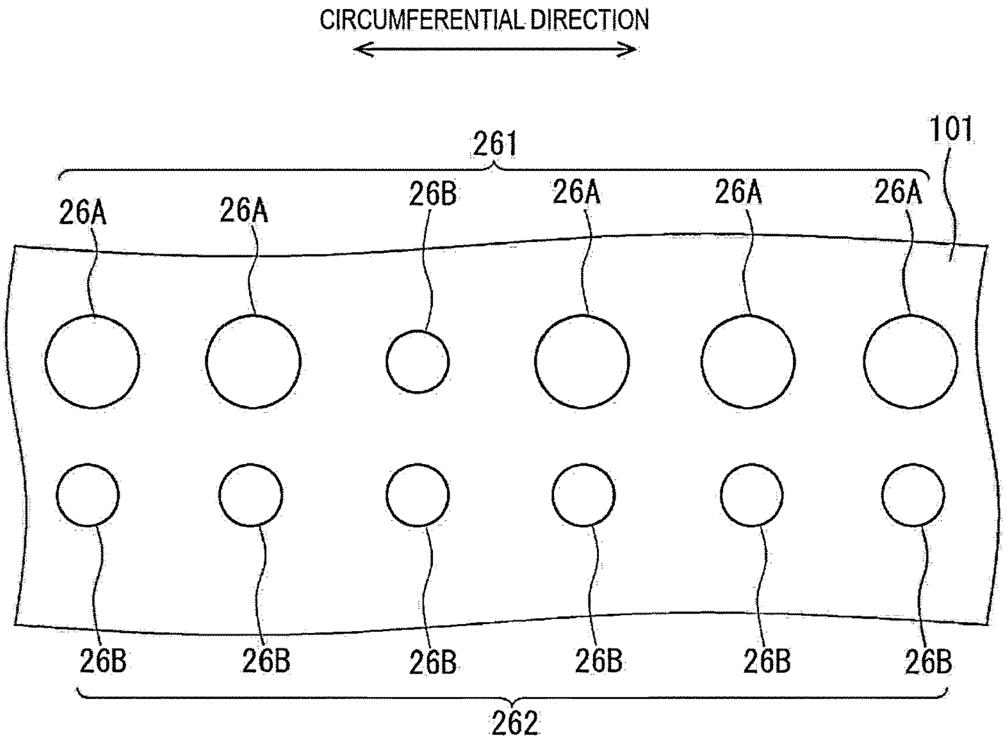
FIG. 9 is a view illustrating an arrangement of the first discharge ports and the second discharge ports according to a fourth modification.
Figure 10:
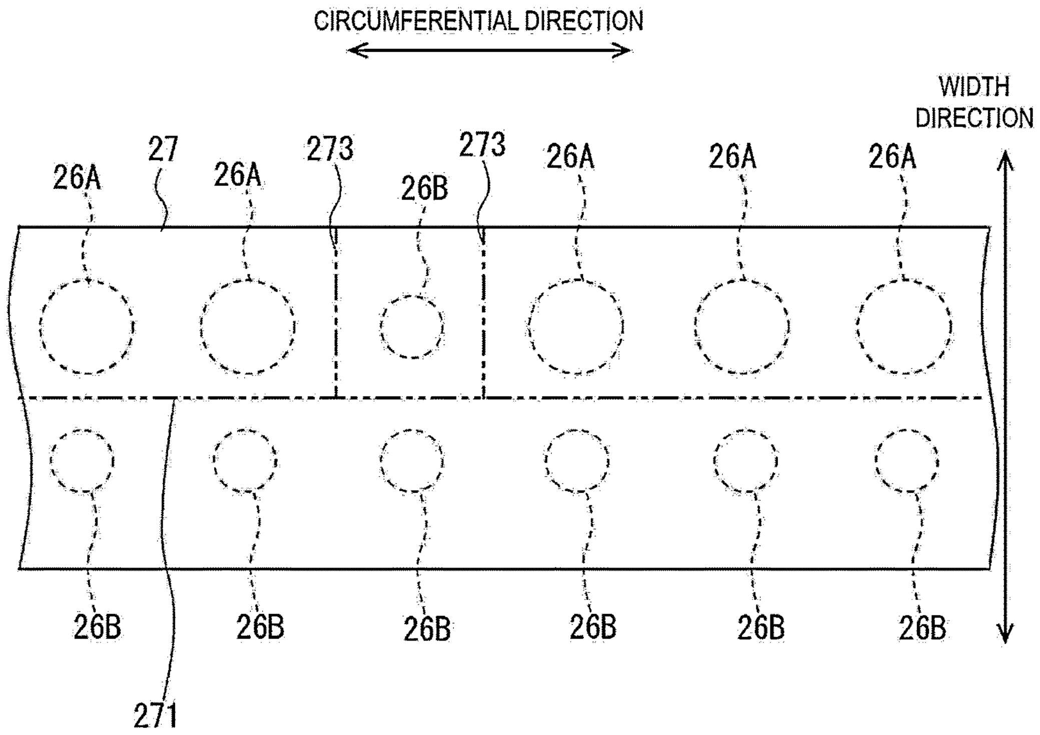
FIG. 10 is a view illustrating a configuration of the seal tape covering the first discharge ports and the second discharge ports in FIG. 9.

FIG. 9 is a view illustrating an arrangement of the first discharge ports 26A and the second discharge ports 26B according to a fourth modification, and FIG. 10 is a view illustrating a configuration of the seal tape 27 covering the first discharge ports 26A and the second discharge ports 26B of FIG. 9. This modification, as compared with the embodiment described above, differs in the arrangement of the first discharge ports 26A and the second discharge ports 26B and the configuration of the seal tape 27. Note that, because other configurations are the same as those of the embodiment described above, the same elements are denoted by the same reference signs and the like, and description thereof will not be repeated.

In the example in FIG. 9, a row 261 in which the first discharge ports 26A and the second discharge ports 26B are mixed as in FIG. 5, and a row 262 in which only the second discharge ports 26B are disposed are provided. Further, in the example in FIG. 9, the seal tape 27 is disposed covering the first discharge ports 26A and the second discharge ports 26B, and the breakage assisting portion 271 is provided in the longitudinal direction of the seal tape 27 at the center in the width direction. That is, the breakage assisting portion 271 is disposed between the row 261 including the first discharge ports 26A and the row 262 in which the second discharge ports 26B are disposed.

Further, in the seal tape 27, at boundary portions between the first discharge ports 26A and the second discharge ports 26B aligned in the circumferential direction of the upper container 1, the breakage assisting portions 273 are provided in a direction separating the seal tape 27 between the first discharge ports 26A and the second discharge ports 26B, that is, in the width direction of the seal tape 27.

According to this modification, when the pressure in the housing 3 exceeds the first rupture pressure without exceeding the second rupture pressure and a force that causes separation from the wall surface is applied to the portion of the seal tape 27 covering the first discharge ports 26A, the breakage assisting portions 271, 273 rupture, causing separation from the portion covering the second discharge ports 26B, thereby suppressing the rupture of the portion covering the second discharge ports 26B under the second rupture pressure or less. Accordingly, the gas generator 100 of this modification can achieve appropriate output.

Fifth Modification

Figure 11:
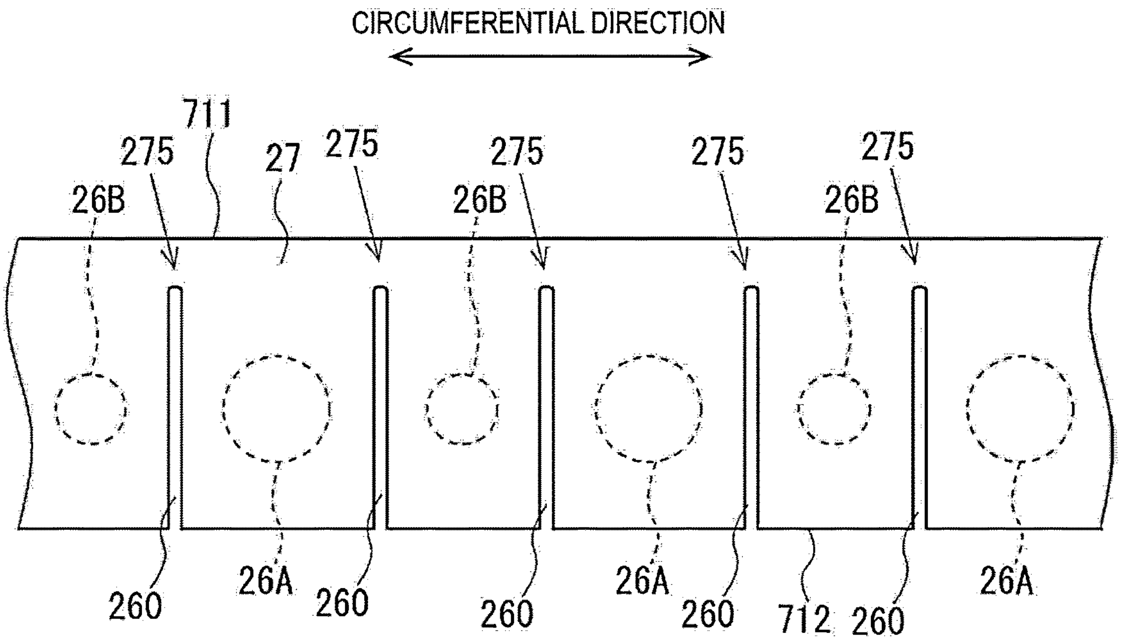
FIG. 11 is a view illustrating a configuration of the seal tape according to a fifth modification.

FIG. 11 is view illustrating a configuration of the seal tape 27 according to a fifth modification. As compared with the second modification described above, the configuration of the seal tape 27 is different. Note that, because other configurations are the same as those of the second modification described above, the same elements are denoted by the same reference signs and the like, and description thereof will not be repeated.

In this modification, as illustrated in FIG. 5, the first discharge ports 26A and the second discharge ports 26B are alternately disposed in the circumferential direction of the upper container 1, forming one row. As illustrated in FIG. 11, the seal tape 27 covers the first discharge ports 26A and the second discharge ports 26B, includes cutout portions 260 at boundary portions between the portions covering the first discharge ports 26A and the portions covering the second discharge ports 26B in the width direction of the seal tape 27 (direction along the center axis C), narrowing the width of the seal tape 27. The areas narrowed by these cutout portions 260 are breakage assisting portions 275. That is, each of the breakage assisting portions 275 is a fragile portion formed narrower and more fragile than at least the portion covering the second discharge ports 26B. Note that the breakage assisting portion 275 may be a fragile portion that, in addition to being formed with a narrow width, is provided with a cut in the thickness direction as in the first embodiment, or may be a fragile portion made up of perforations as in the first modification. Further, the cutout portion 260 may be linearly cut without a width in the length direction of the seal tape 27 (left-right direction in FIG. 11).

According to this modification, when the pressure in the housing 3 exceeds the first rupture pressure without exceeding the second rupture pressure and a force that causes separation from the wall surface is applied to the portion of the seal tape 27 covering the first discharge ports 26A, the breakage assisting portions 275 rupture, causing separation from the portion covering the second discharge ports 26B, thereby suppressing the rupture of the portion covering the second discharge ports 26B under the second rupture pressure or less. Accordingly, the gas generator 100 of this modification can achieve appropriate output.

Second Embodiment

Figure 12:
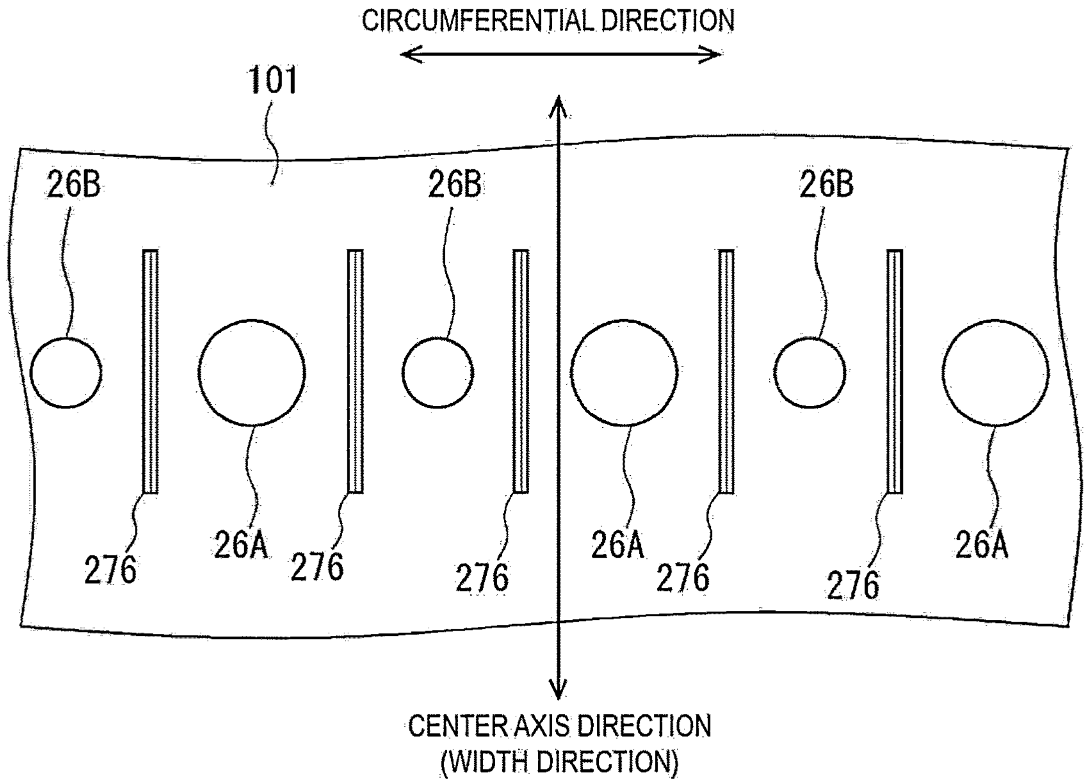
FIG. 12 is a view illustrating a configuration of the first discharge ports, the second discharge ports, and breakage assisting portions according to a second embodiment.
Figure 13:
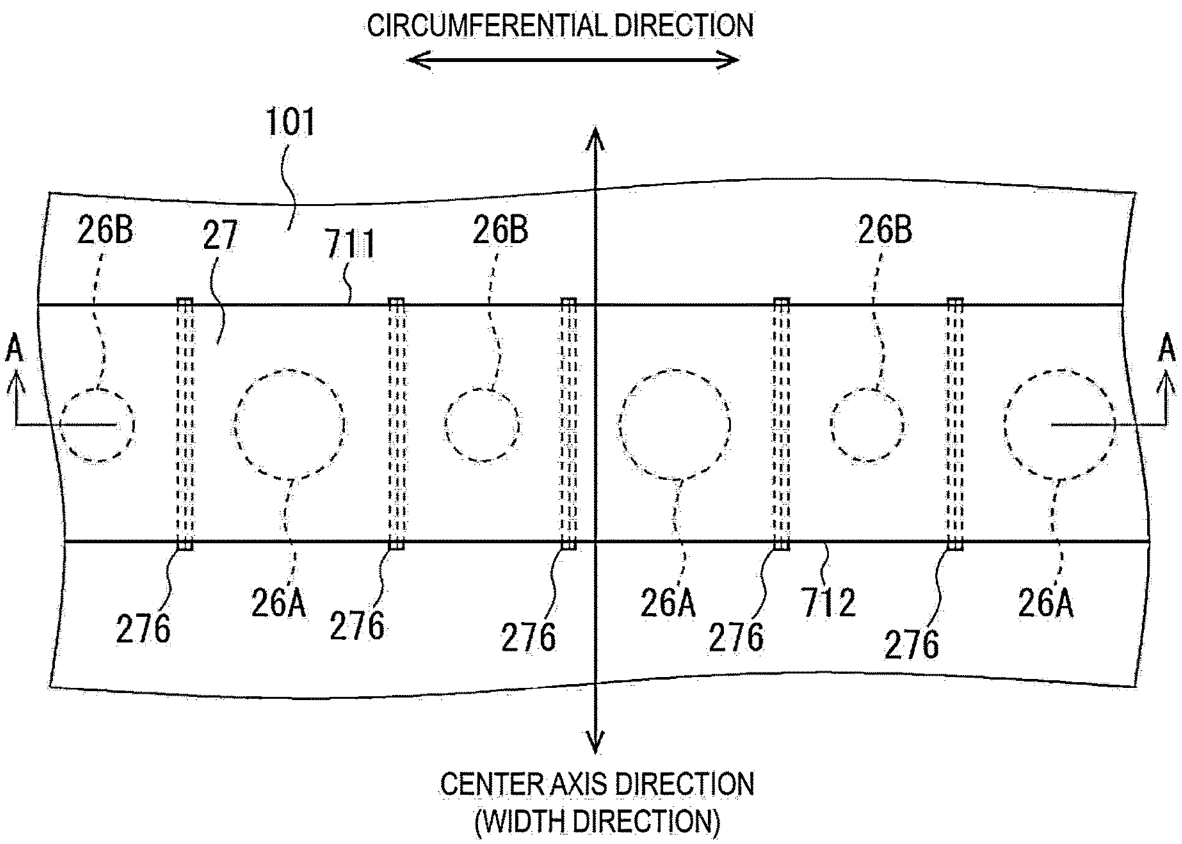
FIG. 13 is a view illustrating the seal tape covering the first discharge ports and the second discharge ports.
Figure 14:
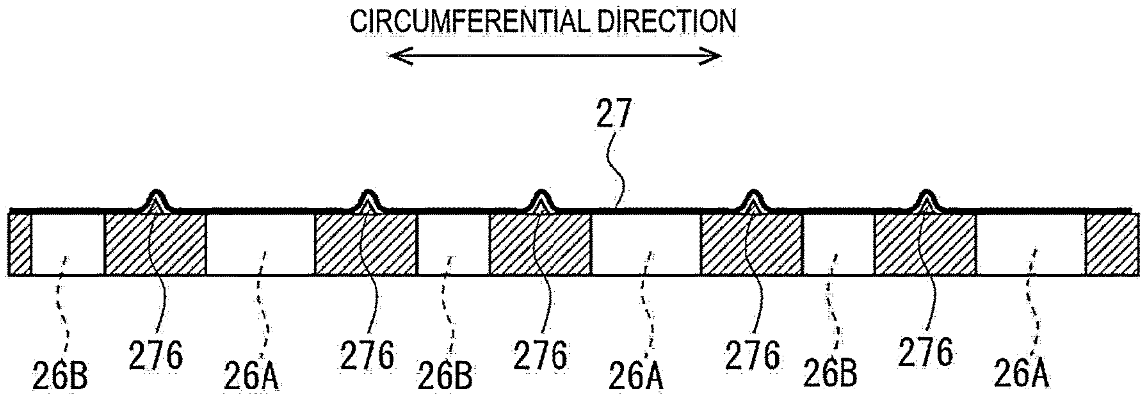
FIG. 14 is a cross-sectional view taken along line A-A of FIG. 13.

FIG. 12 is a view illustrating a configuration of the first discharge ports 26A, the second discharge ports 26B, and breakage assisting portions 276 according to a second embodiment, FIG. 13 is a view illustrating the seal tape 27 covering the first discharge ports 26A and the second discharge ports 26B, and FIG. 14 is a cross-sectional view taken along line A-A in FIG. 13. The present embodiment, as compared with the second modification described above, differs in the configuration of the upper container 1 being provided with the breakage assisting portions 276. Note that, because other configurations are the same as those of the second modification described above, the same elements are denoted by the same reference signs and the like, and description thereof will not be repeated.

The breakage assisting portion 276 of the present embodiment is a protrusion on the inner wall surface of the peripheral wall portion 101 of the upper container 1, protruding toward the attachment side of the seal tape 27, that is, toward the center of the housing 3. Further, the breakage assisting portion 276 is formed at each boundary portion between the first discharge ports 26A and the second discharge ports 26B adjacent to each other. A top portion of the breakage assisting portion 276 is formed at an acute angle, facilitating breakage of the seal tape 27. The breakage assisting portion 276 of the present embodiment has a triangular column shape, and is formed to be long in the center axis C direction. Note that the shape of the breakage assisting portion 276 is not limited thereto and may be any shape as long as the seal tape 27 can be broken. The breakage assisting portion 276 may be added to the inner wall surface of the upper container 1 by welding, brazing, bonding, or the like, or may be formed by cutting a portion of the inner wall surface of the upper container 1 other than the breakage assisting portion 276.

In the present embodiment, as illustrated in FIG. 13 and FIG. 14, the seal tape 27 is attached, covering the first discharge ports 26A, the second discharge ports 26B, and the breakage assisting portions 276. At this time, the breakage assisting portions 276 are each formed longer than the width of the seal tape 27 in the center axis C direction and, when the pressure in the housing 3 increases and the seal tape 27 is pressed against the breakage assisting portions 276, the seal tape 27 is separated from the upper side 711 to the lower side 712.

According to the present embodiment, when the gas generator 100 is actuated and the pressure in the housing 3 exceeds the first rupture pressure without exceeding the second rupture pressure, rupturing the portion of the seal tape 27 covering the first discharge ports 26A and thus applying a force that causes peeling from the wall surface, the portion covering the first discharge ports 26A and the portion covering the second discharge ports 26B are separated from each other by the breakage assisting portions 276, thereby suppressing the rupture of the portion covering the second discharge ports 26B at the second rupture pressure or less. Accordingly, the gas generator 100 of the present embodiment can achieve appropriate output.

Note that, in the present embodiment, the arrangement of the breakage assisting portion 276 is as in the second modification. However, the breakage assisting portion 276 may be provided between the first discharge port 26A and the second discharge port 26B aligned in the up-down direction as in the first embodiment, or the breakage assisting portion 276 may be disposed surrounding the first discharge ports 26A or the second discharge ports 26B as in the third modification.

As described above, each embodiment disclosed in the present specification can be combined with any of the other features disclosed herein.

REFERENCE SIGNS LIST

1 Upper container
10 Through hole
100 Gas generator
101 Peripheral wall portion
11 Seal tape
12 Igniter
12A First igniter
12B Second igniter
13 Collar
131 Hole portion
14 Separation tube
15A First transfer charge accommodating chamber
15B Second transfer charge accommodating chamber
16A, 16B Transfer charge
17 Flame transferring hole
18 Seal tape
19 Flame transferring hole
2 Lower container
20 Seal tape
21 Hole portion
22 Coolant filter
26 Gas discharge port
260 Cutout portion
26A First discharge port
26B Second discharge port
27 Seal tape
271 to 276 Breakage assisting portion
3 Housing
4 Inner tubular member
5A Combustion chamber
5B Combustion chamber
7 Partition wall
721 Seal layer
722 Adhesive layer
72A Cut portion
72B Non-cut portion
8 Igniter accommodating chamber
9 Gas generating agent
9A Gas generating agent
9B Gas generating agent

The invention claimed is:

1. A gas generator, comprising:
a housing;
first discharge port provided in the housing and configured to discharge the combustion gas generated in the housing to an outside;
second discharge port provided in the housing together with the first discharge port and configured to discharge the combustion gas generated in the housing to the outside; and
a closing member covering the first discharge port and the second discharge port together and provided inside the housing, the closing member including,
a portion covering the first discharge port and configured to rupture at a first rupture pressure and a portion covering the second discharge port and configured to rupture at a second rupture pressure higher than the first rupture pressure, and
a breakage assisting portion configured to reduce the strength of a closing member at least at a boundary portion between the first discharge port and the second discharge port, wherein a pressure at which the closing member covering the first discharge port ruptures is lower than a pressure at which the closing member covering the second discharge port ruptures.

2. The gas generator according to claim 1, wherein
an opening area of the first discharge port is larger than an opening area of second discharge port.

3. The gas generator according to claim 2, wherein
the breakage assisting portion is a fragile portion provided in the closing member.

4. The gas generator according to claim 2, wherein
a thickness of the closing member covering the first discharge port is the same as a thickness of the closing member covering the second discharge port.

5. The gas generator according to claim 1, wherein
the breakage assisting portion is a fragile portion provided in the closing member.

6. The gas generator according to claim 5, wherein
the closing member is a sheet attached along a wall surface of the housing provided with the first discharge port and the second discharge port, and
the breakage assisting portion is an area of the closing member where a thickness dimension of the sheet is less than a thickness dimension of at least the portion covering the second discharge port.

7. The gas generator according to claim 5, wherein
the closing member is a sheet attached along a wall surface of the housing provided with the first discharge port and the second discharge port, and
the breakage assisting portion is a linear area where a cut portion cut in a thickness direction of the sheet and a non-cut portion not cut are alternately arrayed in the closing member.

8. The gas generator according to claim 5, wherein
the closing member is a sheet attached to a wall surface of the housing in a circumferential direction of the housing and includes, at a boundary portion between the portion covering the first discharge port and the portion covering the second discharge port in the circumferential direction, a cutout portion where the closing member is cut out, narrowing a width of the closing member in a width direction of the closing member, and
the breakage assisting portion is an area of the closing member where the width is narrowed by the cutout portion.

9. The gas generator according to claim 1, wherein
the closing member is a sheet attached along a wall surface of the housing provided with the first discharge port and the second discharge port, and
the breakage assisting portion is a protrusion formed at a boundary portion between the first discharge port and the second discharge port and protruding from the wall surface of the housing toward the closing member.

10. The gas generator according to claim 1, wherein
the first discharge port and the second discharge ports are arrayed on a wall surface of the housing in a circumferential direction of the housing,
the closing member is provided in an arrayed direction of the first discharge port and the second discharge port, and the breakage assisting portion is provided in a direction in which the portion covering the first discharge port and the portion covering the second discharge port are separated from each other in the closing member.

11. The gas generator according to claim 1, wherein the breakage assisting portion is linearly formed and surrounds the first discharge port or the second discharge port.

12. The gas generator according to claim 1, wherein the breakage assisting portion is a fragile portion provided in a seal.

13. The gas generator according to claim 12, wherein the seal is a sheet attached along a wall surface of the housing provided with the first discharge port and the second discharge port, wherein the seal has:

a first portion covering the first discharge port and configured to rupture at a first rupture pressure, and a second portion covering the second discharge port and configured to rupture at a second rupture pressure higher than the first rupture pressure, and wherein the breakage assisting portion is an area of the seal where a thickness dimension of the sheet is less than a thickness dimension of at least the second portion.

14. The gas generator according to claim 12, wherein the seal is a sheet attached along a wall surface of the housing provided with the first discharge port and the second discharge port, and the breakage assisting portion is a linear area where a cut portion cut in a thickness direction of the sheet and a non-cut portion not cut are alternately arrayed in the seal.

15. The gas generator according to claim 12, wherein the seal is a sheet attached to a wall surface of the housing in a circumferential direction of the housing and includes, at a boundary portion between the first portion and the second portion, a cutout portion where the seal is cut out, narrowing a width of the seal in a width direction of the seal, and the breakage assisting portion is an area of the seal where the width is narrowed by the cutout portion.

16. A gas generator, comprising:

a housing;

a first discharge port provided in the housing and configured to discharge a combustion gas generated in the housing to an outside of the housing;

a second discharge port provided in the housing together with the first discharge port and configured to discharge the combustion gas generated in the housing to the outside of the housing; and a seal covering the first discharge port and the second discharge port together, the seal is provided inside the housing, the closing member including, a first portion covering the first discharge port and configured to rupture at a first rupture pressure, a second portion covering the second discharge port and configured to rupture at a second rupture pressure higher than the first rupture pressure, and a breakage assisting portion configured to reduce the strength of the seal at a boundary portion between the first discharge port and the second discharge port.

17. The gas generator according to claim 16, wherein an opening area of the first discharge port is larger than an opening area of the second discharge port.

18. The gas generator according to claim 16, wherein the seal is a sheet attached along a wall surface of the housing provided with the first discharge port and the second discharge port, and the breakage assisting portion is a protrusion formed at a boundary portion between the first discharge port and the second discharge port and protruding from the wall surface of the housing toward the seal.

19. The gas generator according to claim 16, wherein the first discharge port and the second discharge port are arrayed on a wall surface of the housing in a circumferential direction of the housing, the seal is provided in an arrayed direction of the first discharge port and the second discharge port, and the breakage assisting portion is provided in a direction in which the first portion and the second portion are separated from each other in the seal.

* * * * *